United States Patent [19]
Williams et al.

[11] Patent Number: 5,949,627
[45] Date of Patent: *Sep. 7, 1999

[54] THIN FILM MAGNETIC HEAD WITH STRESS RELIEF LAYERING

[75] Inventors: Edgar M. Williams, Palo Alto; Peter G. Bischoff, Cupertino; Daniel A. Nepela, San Jose, all of Calif.

[73] Assignee: Read-Rite Corporation, Milpitas, Calif.

[ * ] Notice: This patent is subject to a terminal disclaimer.

[21] Appl. No.: 08/020,306

[22] Filed: Feb. 19, 1993

[51] Int. Cl.⁶ .................................................. G11B 5/147
[52] U.S. Cl. ............................................................ 360/126
[58] Field of Search .................................... 360/126, 121, 360/123, 128

[56] References Cited

U.S. PATENT DOCUMENTS

| | | | |
|---|---|---|---|
| 4,652,954 | 3/1987 | Church | 360/123 |
| 4,716,484 | 12/1987 | Kaminaka et al. | 360/126 |
| 4,780,781 | 10/1988 | Sano et al. | 360/126 |
| 4,943,879 | 7/1990 | Takano et al. | 360/126 |
| 4,951,166 | 8/1990 | Schewe | 360/126 |
| 5,032,944 | 7/1991 | Ohdoi | 360/126 |
| 5,126,907 | 6/1992 | Hamakawa et al. | 360/126 |
| 5,241,440 | 8/1993 | Ashida et al. | 360/126 |
| 5,296,993 | 3/1994 | Aboaf et al. | 360/126 |

FOREIGN PATENT DOCUMENTS

| | | | |
|---|---|---|---|
| 0185289 | 6/1986 | European Pat. Off. | 360/126 |
| 57-18014 | 1/1982 | Japan | 360/126 |

*Primary Examiner*—Allen T. Cao
*Attorney, Agent, or Firm*—Nathan N. Kallman

[57] ABSTRACT

A thin film magnetic head is fabricated having soft metal layers of 0.25 to 1 micron thickness disposed on each side of the first and second magnetic layers of Permalloy forming the magnetic yoke. The soft layers are formed between the ceramic substrate and the first Permalloy layer, between the first Permalloy layer and the insulation surrounding the electrical coil of the head, between the insulation and the second Permalloy layer, and between the second Permalloy layer and the insulating overcoat of the head. The soft metal has a coefficient of thermal expansion between that of the Permalloy and that of the ceramic substrate and insulation materials. In this way, stress buffers are provided to minimize the mismatch and thermal stress transfer between the Permalloy and the other materials of the adjacent layers, resulting in improved domain stability and a significant reduction in popcorn noise.

10 Claims, 1 Drawing Sheet

THIN FILM MAGNETIC HEAD WITH STRESS RELIEF LAYERING

FIELD OF THE INVENTION

This invention relates to thin film magnetic heads and in particular to the structure of the magnetic yoke of a thin film head.

BACKGROUND OF THE INVENTION

Thin film magnetic heads are used extensively in data processors, such as disk drives. A typical thin film head comprises, inter alia, a nonmagnetic ceramic substrate, first and second magnetic layers typically made of Permalloy (Nife) that form a yoke, and an electrically conductive coil. The magnetic flux that is generated in the yoke interacts with current in the conductive coil to effectuate transducing of data signals during write and read modes. Conventionally, the first magnetic yoke layer P1 is formed as a substantially planar layer above the substrate and the second magnetic yoke layer P2 is configured in spaced relation above the P1 layer with the electrical coil interposed between the two magnetic layers. An insulating photoresist epoxy surrounds the coil to prevent electrical shorting between the conductive coil and the Permalloy layers. A via or through hole is provided to allow contact between the P1 layer and the P2 layer to form a closure and a thus a substantially continuous magnetic path. An insulating layer provides a transducing gap between two pole tips at the ends of the P1 and P2 magnetic layers of the yoke structure which interfaces with a magnetic medium during reading and recording of data signals.

One problem that is experienced when operating with thin film heads is head relaxation noise, also known as popcorn noise, which is associated with the magnetic domains inherent in the yoke material. This noise manifests itself as noise spikes which adversely affect the data signal being processed. The level of noise is in proportion to the length of the domain wall that is collinearly aligned with the electrical coil turns. Popcorn noise and possibly wiggle (domain instability) are caused by thermal rise during writing in the cross-linked photoresist epoxy through mismatch of the expansion coefficients of Permalloy and of the cross-linked epoxy whose thermal expansion coefficients are $12.5 \times 10^{-6}/°$C. and $50 \times 10^{-6}/°$ C. respectively. Also there is a mismatch of the Permalloy expansion coefficient with that of the slider material, which typically is titanium carbide (TiC) or alumina ($Al_2O_3$), and with the $Al_2O_3$ overcoat or cap layer of the thin film head.

Constant efforts have been made to reduce the noise problem and improve head operating efficiency. In an abstract delivered at the Intermag Conference in Pittsburgh in April, 1991, entitled "A Study of Popcorn Noise for Thin Film Heads", K. Morikawa et al. describe an approach for decreasing popcorn noise by narrowing the width of the yoke and/or changing the Fe composition of the magnetic Fe-Ni material used in the yoke. Another article that discusses noise relaxation in thin film heads is found in an abstract by K. B. Klassen et al., IEEE Trans. Magn. MAG-25, 3212–3214 (1989). These prior art thin film heads still experience a significant level of popcorn noise and are characterized by a relatively high inductance which adversely affects the signal being processed through the heads. It is highly desirable to reduce the degrading popcorn noise and thus improve the signal-to-noise ratio.

Summary of the Invention

An object of this invention is to provide a thin film magnetic head that operates with a significant reduction of popcorn noise.

Another object of this invention is to reduce domain instability, which further results in reduced popcorn noise.

According to this invention, a thin film magnetic head is formed with layers of soft metal for separating the Permalloy layers from adjacent layers. The soft metal layers provide a stress transfer buffer between the Permalloy and the thermally mismatched adjacent layers and reduce the effects of the mismatch between the Permalloy and the ceramic substrate and adjacent layers. By minimizing stress in the Permalloy, popcorn noise is significantly reduced. In implementing the invention, the stress buffer layers comprise antimony (Sb), tin (Sn) or lead (Pb), aluminum (Al) or alloys thereof, which may be deposited either by plating or by vacuum deposition.

BRIEF DESCRIPTION OF THE DRAWING

The invention will be described in greater detail with reference to the sole figure of the drawing in which.

DETAILED DESCRIPTION OF THE INVENTION

Figure 1:
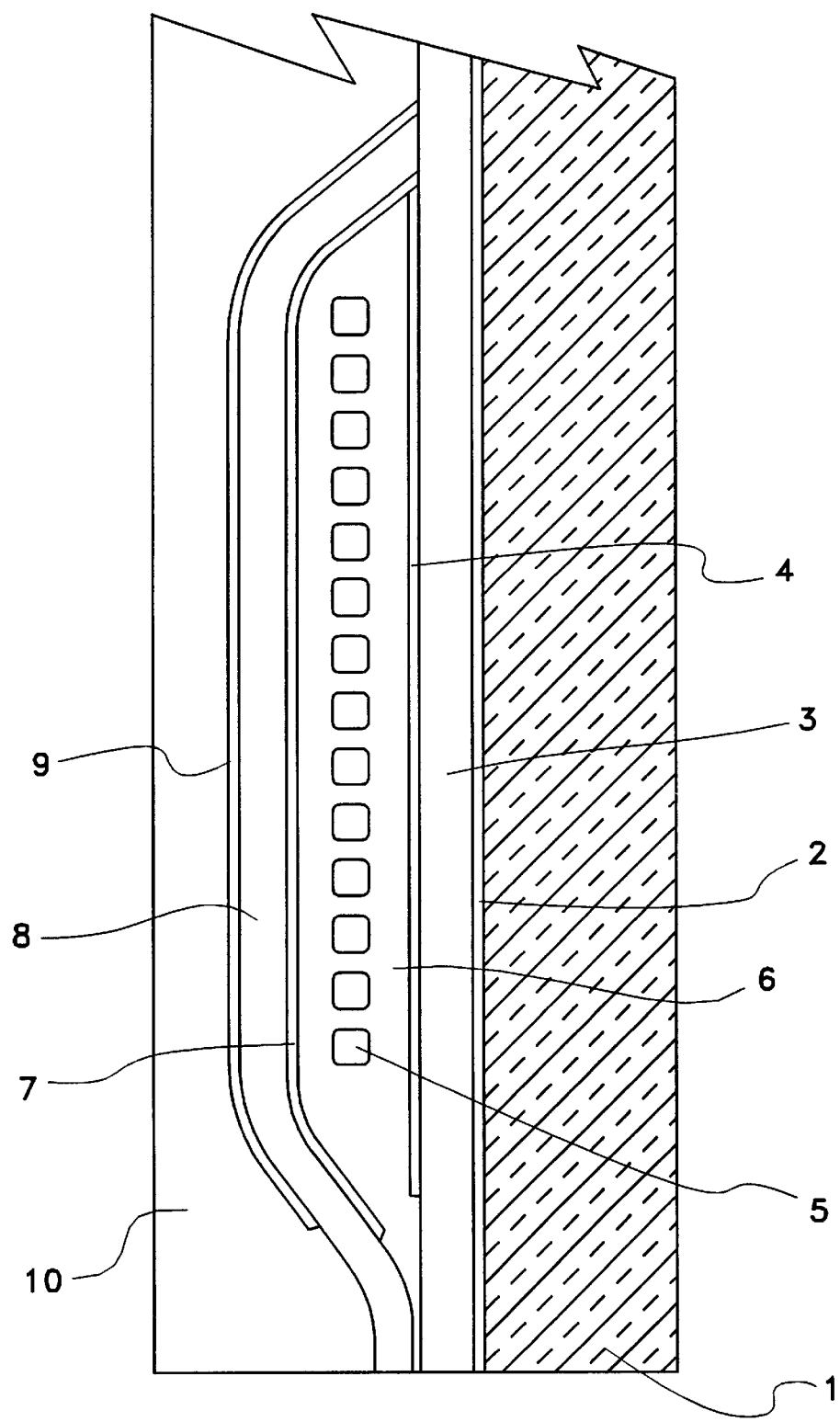
FIG. 1 is a schematic cross-sectional view, partly broken away, of a typical thin film magnetic head, showing the incorporation of the stress buffer soft metal layers, in accordance with this invention.

With reference to FIG. 1, a thin film head includes a ceramic substrate 1, which is made from a polished alumina or TiC material, upon which is first deposited by plating or vacuum deposition a soft metal layer 2. The soft metal layer 2 is preferably made of Sn, Pb, Sb or Al, but is not limited to such metals. A preferred thickness range for this first and subsequent soft metal layers is between 0.25 to 1.0 microns. A Permalloy layer 3 is next deposited, by conventional means. A second soft metal layer 4 is then deposited. Copper turns 5 encompassed by a cured or cross-linked photoresist 6 are next added by well known deposition techniques. A third soft metal layer 7 is then deposited, followed by the second Permalloy layer 8, and a final soft metal layer 9. An insulating overcoat 10 is deposited adjacent to the soft metal layer 9.

Examples of the mechanical and thermal properties of the various materials are illustrated below.

|  | Yield Strength dyne/cm$^2$ | Thermal Expansion $\Delta 1/1/°$ C. | Thermal Conductivity cgs | Melt Temp. |
|---|---|---|---|---|
| Sb | $0.11 \times 10^9$ | $12 \times 10^{-6}$ | 0.04 | 631° C. |
| Sn | $0.15 \times 10^9$ | $27 \times 10^{-6}$ | 0.153 | 232° C. |
| Pb | $0.09 \times 10^9$ | $29 \times 10^{-6}$ | 0.083 | 327° C. |
| Al | $1.10 \times 10^9$ | $25 \times 10^{-6}$ | 0.43 | 666° C. |
| Ni (Permalloy) | $3.2 \times 10^9$ | $12.8 \times 10^{-6}$ | 0.151 | 1455° C. |
| Cured decomp. Photoresist | $0.8 \times 10^9$ | $50 \times 10^{-6}$ | <0.004 | >225° C. |
| $Al_2O_3$—TiC | >3.2 | $8 \times 10^{-6}$ | 0.1 | >2,000° C. |

By providing low yield strength (ductile) metals as stress buffers between Permalloy and other Permalloy contacting members of a thin film inductive read-write head, stress effects caused by mismatches of the thermal expansion coefficients of the contacting members can be significantly reduced. This minimizes popcorn noise and domain instability in thin film read-write inductive magnetic recording heads.

If one limits the thermal stress that can be transferred to the Permalloy by providing a stress transfer buffer by virtue of providing a soft metal layer, which can be plated or vacuum deposited, between the Permalloy and the adjacent materials having mismatched thermal expansion coefficients. Preferably, the coefficient of thermal expansion of the soft metal layer is between that of the Permalloy and the adjacent materials. The yield strength of the Permalloy is 3 to 35 times greater than that of any contacting soft members. During operation, plastic flow in the low yield strength (ductile) soft metals will occur and limit the transferred stress to approximately 1/3 to 1/35 of that experienced in a conventional head. Accordingly, stress induced noise signals are minimized, thus improving the signal-to-noise ratio of the device.

By maintaining the thickness range of the soft metal layers in the range of 0.25 to 1 micron, significant reduction in popcorn noise is achieved. Domain stability is enhanced by reducing stress transfer to the Permalloy layers. Other soft metals or soft metal combinations may be used, having a thermal coefficient of expansion range between that of the Permalloy and the underlying ceramic substrate.

What is claimed is:

1. A thin film magnetic head comprising:

a nonmagnetic substrate;

a magnetic yoke structure disposed over said substrate, said yoke structure including first and second layers of a magnetic material making contact for forming a closure and a substantially continuous magnetic path, said layers defining a transducing gap therebetween;

an electrical coil disposed between said magnetic layers;

insulating material disposed between said coil and said magnetic layers and encompassing said coil;

an insulating overcoat disposed over said magnetic head and said second magnetic layer; and a soft metal layer of a material having a thermal expansion coefficient between that of the material of said magnetic layers and said insulating material, said soft metal layer being disposed between one of said magnetic layers and said insulating material, said soft metal layer material being ductile and characterized by a yield strength substantially less than the yield strength of the material of said magnetic layers;

whereby domain instability and popcorn noise is significantly reduced.

2. A thin film magnetic head as in claim 1, including a soft metal layer disposed between said second magnetic layer and said insulating overcoat.

3. A thin film magnetic head as in claim 1, including a soft metal layer disposed between said first magnetic layer and said nonmagnetic substrate.

4. A thin film magnetic head as in claim 1, wherein the thickness of said soft metal layer is between 0.25 and 1 micron.

5. A thin film magnetic head as in claim 1, wherein said soft metal layer is made of lead, antimony, tin or aluminum.

6. A thin film magnetic head as in claim 1, wherein said soft metal layer is ductile and characterized by low yield strength.

7. A thin film magnetic head as in claim 1, wherein said soft metal layer is plated or vacuum deposited.

8. A thin film magnetic head as in claim 1, wherein said magnetic layers are of an alloy material comprising nickel and iron.

9. A thin film magnetic head as in claim 1, wherein said insulating material is a cured or cross-linked photoresist.

10. A method of reducing thermal stress transfer to the magnetic layers of a thin film magnetic head comprising a nonmagnetic ceramic substrate and a magnetic yoke structure including said magnetic layers disposed over said substrate, comprising the steps of depositing layers of soft metal on each side of said magnetic layers, said soft metal having a thermal expansion coefficient between that of said nonmagnetic substrate and said magnetic layers, said soft metal being ductile and characterized by a yield strength substantially less than the yield strength of the material of said magnetic layers whereby popcorn noise is reduced.

\* \* \* \* \*